(12) United States Patent
Su

(10) Patent No.: US 7,408,794 B2
(45) Date of Patent: Aug. 5, 2008

(54) TRIPLE VOLTAGE DC-TO-DC CONVERTER AND METHOD

(75) Inventor: Gui-Jia Su, Knoxville, TN (US)

(73) Assignee: UT-Battele LLC, Oak Ridge, TN (US)

( * ) Notice: Subject to any disclaimer, the term of this patent is extended or adjusted under 35 U.S.C. 154(b) by 218 days.

(21) Appl. No.: 11/409,597

(22) Filed: Apr. 24, 2006

(65) Prior Publication Data

US 2007/0195557 A1 Aug. 23, 2007

Related U.S. Application Data

(60) Provisional application No. 60/775,433, filed on Feb. 21, 2006.

(51) Int. Cl.
*H02M 3/24* (2006.01)

(52) U.S. Cl. .......................................... 363/98; 363/17

(58) Field of Classification Search ............. 363/16–17, 363/41, 98, 89, 132, 127, 58, 27; 323/222–224

See application file for complete search history.

(56) References Cited

U.S. PATENT DOCUMENTS 6,370,050 B1 * 4/2002 Peng et al. .................... 363/98

OTHER PUBLICATIONS

Su, Gui-Jia, "A Low Cost, Triple-Voltage Bus DC/DC Converter for Automotive Applications," Oak Ridge National Laboratory, managed by UT-Battelle, LLC.

* cited by examiner

*Primary Examiner*—Rajnikant Patel
(74) *Attorney, Agent, or Firm*—Boyle Fredrickson, S.C.

(57) ABSTRACT

A circuit and method of providing three dc voltage buses and transforming power between a low voltage dc converter and a high voltage dc converter, by coupling a primary dc power circuit and a secondary dc power circuit through an isolation transformer; providing the gating signals to power semiconductor switches in the primary and secondary circuits to control power flow between the primary and secondary circuits and by controlling a phase shift between the primary voltage and the secondary voltage. The primary dc power circuit and the secondary dc power circuit each further comprising at least two tank capacitances arranged in series as a tank leg, at least two resonant switching devices arranged in series with each other and arranged in parallel with the tank leg, and at least one voltage source arranged in parallel with the tank leg and the resonant switching devices, said resonant switching devices including power semiconductor switches that are operated by gating signals. Additional embodiments having a center-tapped battery on the low voltage side and a plurality of modules on both the low voltage side and the high voltage side are also disclosed for the purpose of reducing ripple current and for reducing the size of the components.

13 Claims, 4 Drawing Sheets

TRIPLE VOLTAGE DC-TO-DC CONVERTER AND METHOD

CROSS REFERENCE TO RELATED APPLICATIONS

The benefit of U.S. Provisional Appl. No. 60/775,433 filed Feb. 21, 2006, is claimed herein.

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

TECHNICAL FIELD

This invention relates to an improvement in dc-to-dc converters for interconnecting multiple electrical networks of different voltages in hybrid electric and electric vehicles, for example.

BACKGROUND ART

Because the 14-volt electrical system in present automobiles has reached its limits of capability, a 42-volt power network has been proposed to cope with the increasing electrical loads. This is particularly true for electrical and hybrid vehicles in which more engine-driven mechanical and hydraulic systems are being replaced with electrical systems to increase efficiency. These vehicles also utilize at least one high voltage bus exceeding 100 dc volts. During the transition to the 42-volt system, most automobiles are expected to employ a dual-level voltage system, in which a bi-directional dc-to-dc converter will interface the two voltage networks. Additionally, battery-internal combustion (I.C.) engine hybrid electric vehicles (HEVs) or fuel-cell-powered electric vehicles (FCEVs) employ a third dc bus at a much higher voltage (typically above 200V) (H.V.) for the traction motor drive. In these HEVs and FCEVs, the dc-to-dc converter controls power on the 14-volt, 42-volt and high voltage buses.

In a prior U.S. Pat. No. 6,370,050, assigned to the present assignee, a dc-to-dc converter for interfacing these buses was disclosed. Although not shown in this patent, a large filter capacitor (several hundreds to thousands of microfarad) was needed to connect a 14-volt bus in parallel with the loads to maintain a reasonably smooth dc voltage at the bus. And yet, the dc voltage still fluctuated on the low voltage side, as the switches $S_1$ and $S_2$ turned on and off, because the voltage at the midpoint between the two switches rapidly changes between the ground potential and the 42-volt bus. A fluctuating band is determined by the switching frequency of the two power semiconductor switches, $S1$ and $S_2$, by the capacitance of the large filter capacitor (not shown) and by the inductance $L_{dc}$ of a large inductor in the 14-volt bus. A high switching frequency and/or a large inductor or filter capacitor is needed to keep the voltage fluctuations small, which increases power losses in the switches and inductor and/or the size and volume of the inductor and filter capacitor. In addition, the lower switch $S_2$ needs to carry a much larger current than that passes through the upper switch $S_1$ because in addition to the current from the transformer, Tr, the current of the inductor flows through the switch when it is turned on.

A dc-to-dc of similar architecture was disclosed in Su, Gui-Jia and Peng, Fang Z., "A Low Cost, Triple-Voltage Bus DC/DC Converter for Automotive Applications," *IEEE Applied Power Electronics Conference and Exposition* (APEC), vol. 2, pp. 1015-1021, Mar. 6-10, 2005, Austin, Tex. In addition to the power semiconductor switches, $S_1$ and $S_2$, on the low voltage side of the converter, there are also typically two additional power semiconductor switches, $S_3$ and $S_4$, on the high voltage side. The above publication discloses an advantageous method of operating the switches using power flow control. The gating signals for the switches can be based on controlling the duty cycle and the phase angle of switching between on and off states.

It is now desired to improve a dc-to-dc converter circuit by providing a circuit with reduced cost, reduced size and reduced power losses. It is also desired to reduce ripple currents (ac currents charging and discharging a capacitor with a dc biased voltage) that are produced by switching of the switches and follow through the dc bus capacitors ($C_1$-$C_4$) in the circuit. Because a capacitor can only handle a fixed amount of ripple current, a higher ripple current requires additional capacitance to bear it; increasing volume and cost.

SUMMARY OF THE INVENTION

The present invention provides a dc-to-dc converter circuit that not only fulfills all of the requirements aforementioned but solves the problems encountered with the prior art. It offers improvements in terms of reduced cost, volume and power losses by moving the 14-volt bus away from the midpoint of the two switches, $S_1$ and $S_2$ and by eliminating the filter capacitor and the inductor, $L_{dc}$. It also maintains a more tightly regulated dc voltage at the 14-volt bus due to the reduced voltage fluctuations and relieves the burden of carrying a large current for the bottom switch. The present invention further provides a means to reduce the ripple currents in the dc bus capacitors ($C_1$-$C_4$), also referred to in this circuit architecture and in the prior art as tank leg capacitors.

The invention is provided by a dc-to-dc converter comprising a transformer; a primary dc power circuit and a secondary dc power circuit coupled through the isolation transformer; the primary dc power circuit and the secondary dc power circuit each further comprising at least two tank capacitances arranged in series as a tank leg, at least two resonant switching devices arranged in series with each other and arranged in parallel with the tank leg, and at least one voltage source arranged in parallel with the tank leg and the resonant switching devices, said resonant switching devices including power semiconductor switches that are operated by gating signals; and a switching controller operable for providing the gating signals to the power semiconductor switches in the primary dc power circuit and secondary dc power circuit to control power flow between the primary and secondary dc power circuits. The switching controller operates to control power flow from the primary circuit to the secondary circuit, or from the secondary circuit to the primary circuit by providing gating signals to control a phase shift between the primary voltage and the secondary voltage on the respective sides of the transformer. The switching controller also operates simultaneously to control the voltages across the capacitors of the tank legs by providing gating signals to control the duty ratio of the resonant switching devices.

The invention is also provided by a method of transforming power between a low voltage dc converter and a high voltage dc converter in a circuit as described above, the method comprising coupling a primary dc power circuit and a secondary dc power circuit coupled through an isolation transformer; providing the gating signals to the power semiconductor switches in the primary and secondary circuits to control power flow between the primary and secondary circuits; providing gating signals to control a phase shift between the primary voltage and the secondary voltage; providing gating signals to control the voltages across the capacitors of the tank legs; and providing gating signals to control a duty ratio of the switches.

Other objects and advantages of the invention, besides those discussed above, will be apparent to those of ordinary skill in the art from the description of the preferred embodiments which follows. In the description reference is made to the accompanying drawings, which form a part hereof, and which illustrate examples of the invention. Such examples, however are not exhaustive of the various embodiments of the invention, and therefore reference is made to the claims which follow the description for determining the scope of the invention.

DETAILED DESCRIPTION

Figure 1:
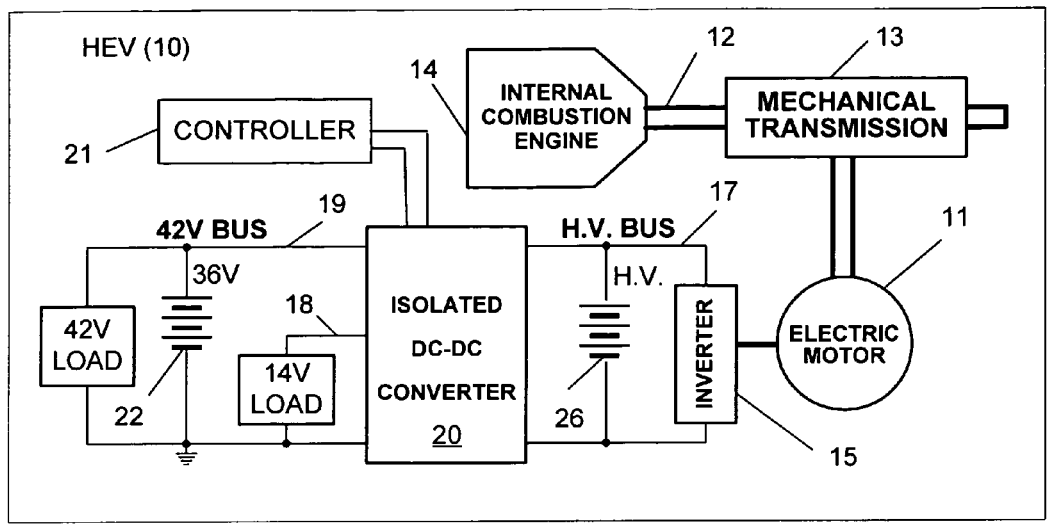
FIG. 1 is a block diagram of a first application of the present invention.
Figure 3:
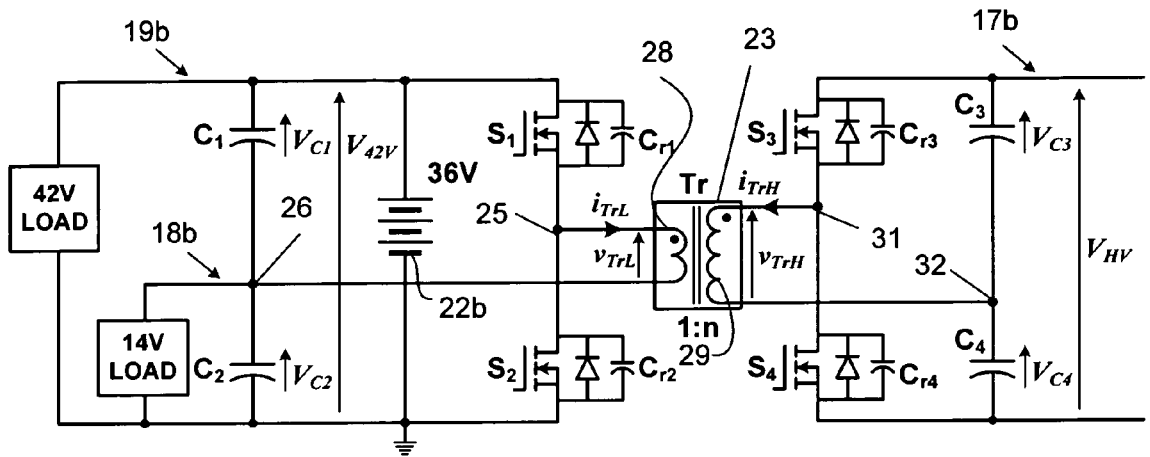
FIG. 3 is an electrical schematic diagram of a first embodiment of the present invention.

While the high voltage bus portion of the converter system varies with different configurations of hybrid electric vehicles, the low voltage bus architecture usually remains about the same. As an example, FIG. 1 illustrates a simplified electrical system in a parallel configuration hybrid electric vehicle 10, where an electric motor 11 is connected to the engine shaft 12 through a mechanical transmission 13 and works in parallel with the internal combustion engine 14 to provide propulsion force to the wheels (not shown) of the vehicle 10. The electric motor 11 is driven and controlled by a power inverter 15 which receives power from a high-voltage battery 26. The inverter 15 adjusts to variations in driving of the vehicle to optimize the fuel efficiency of the internal combustion engine 14. The electric motor 11 is also used to start the internal combustion engine 14 and to charge the high-voltage battery 26 when needed. For charging this battery 26, the motor 11 functions as a generator that is driven either by the internal combustion engine 14 or by the vehicle inertia during deceleration to produces an ac voltage, which is converted to dc by the power inverter to supply the high voltage (HV) bus 17. To power the vehicle electrical loads on the 14-volt or the 42-volt buses 18, 19, a dc-to-dc converter 20 transforms the high voltage to the respective low voltage levels simultaneously through an isolation interface, which is provided by a transformer 23, as seen in FIG. 3. The transformer 23 provides electrical isolation between the low voltage and high voltage sides of the system. A 36-volt battery 22 provides power when the electric motor 11 and internal combustion engine 14 are not in operation. A controller 21 provides gating signals to the semiconductor switches in the converter 20.

Figure 2:
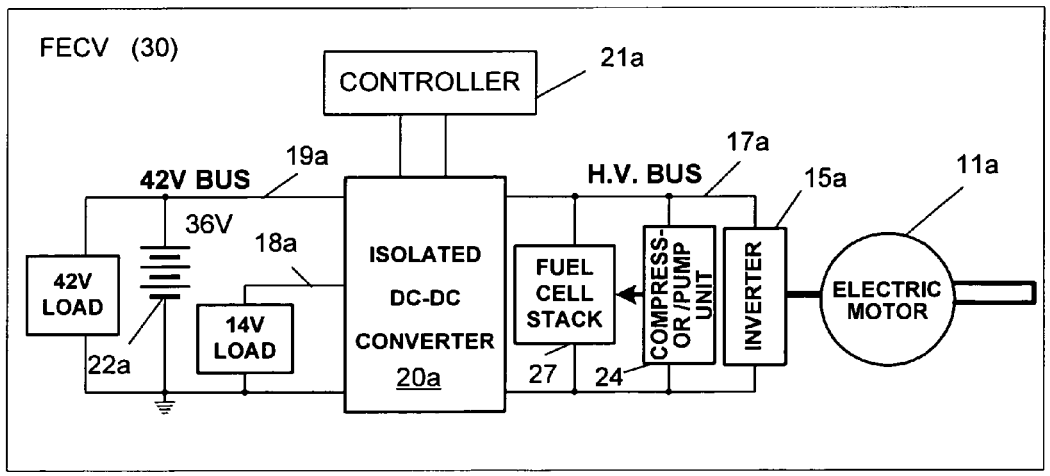
FIG. 2 is a block diagram of a second application of the present invention.

While the dc-to-dc converters in hybrid vehicles need only control power flow in one direction, i.e. from the high voltage bus to the low-voltage buses, they also need to operate in the other direction in fuel-cell-powered electric vehicles (FCEVs) 30, one of which is represented schematically in FIG. 2. As seen in FIG. 2, a bi-directional dc-to-dc converter 20a is therefore required to interconnect the fuel cell powered high voltage bus 17a and the low-voltage buses 18a, 19a for vehicle electrical loads. During vehicle starting, the high voltage bus is boosted up to around 300 volts by the dc-to-dc converter drawing power from the 36-volt battery 22a. This high voltage bus 19a then supplies power for the fuel cell compressor motor and pump unit controller 24 and brings up the fuel cell voltage to the fuel cell stack 27, which in turn feeds back to the high voltage bus 17a to release the loading from the battery 22a and to provide propulsion power through the inverter 15a and the electric motor 11a. The battery 22a is also used for storing the energy captured by regenerative braking during deceleration. A controller 21a provides gating signals to switches in the converter 20a.

FIG. 3 shows a preferred embodiment of the invention comprised of a low voltage dc converter on the 42-volt side and a high voltage dc converter on the high voltage side. The low voltage dc converter consists of two power semiconductor switches, $S_1$ and $S_2$, connected in series across the 42-volt dc bus 19b, two capacitors, $C_1$ and $C_2$, also connected in series across the 42-volt dc bus, and a 36-volt battery 22b as its power source. The midpoint 26 of the two power semiconductor switches, $S_1$ and $S_2$, and the midpoint 25 of the two capacitors, $C_1$ and $C_2$, form the output of the low-voltage converter and are connected to the terminals of the primary winding 28 of a high frequency transformer (Tr) 23. The 14-volt bus 19b is connected to the midpoint 26 of the two capacitors, $C_1$ and $C_2$, and shares with the 42-volt bus a common negative rail, which is usually grounded to the earth for safety. The power semiconductor switches described herein in all embodiments can be of the metal-oxide semiconductor field effect transistors (MOSFET) type and of the insulated gate bipolar transistors (IGBT) type as known in the art.

The high voltage converter is similarly constructed with two switches, $S_3$ and $S_4$, and two capacitors, $C_3$ and $C_4$, with its output 31, 32 connected to the secondary winding 29 of the transformer 23. The high frequency transformer 23 provides voltage level matching between the 42-volt bus 19b and the high voltage bus 17b with a proper turns ratio and galvanic isolation for meeting safety requirements. In addition, four capacitors, $C_{r1}$, $C_{r2}$, $C_{r3}$ and $C_{r4}$, are connected across the switches, $S_1$, $S_2$, $S_3$ and $S_4$, respectively. The topology utilizes the resonance between these capacitors and the leakage inductance of the transformer to provide soft-switching conditions for the switches as explained in more detail in U.S. Pat. No. 6,370,050.

Figure 4:
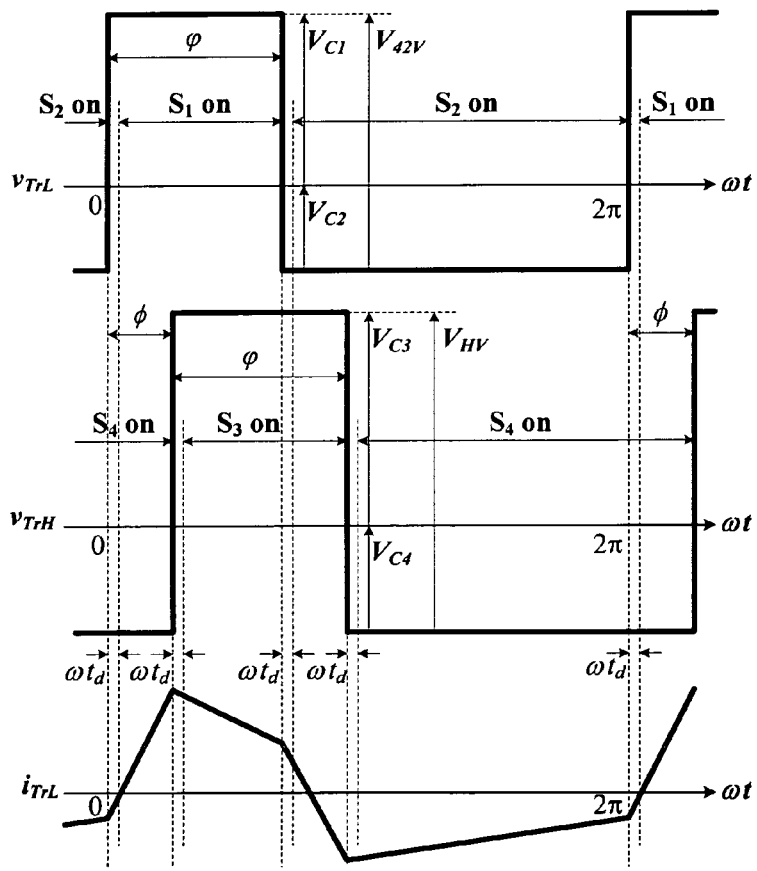
FIG. 4 is a timing diagram of voltage vs. time for switching in embodiment of FIG. 3.

The four switches form two pairs, namely, $S_1$ and $S_2$, $S_3$ and $S_4$. Within each pair, the two switches are turned on and off, alternatively, under the control of a suitably programmed controller 21, 21a and the two pairs are switched at the same frequency to generate a square wave voltage to the transformer 23 as illustrated in FIG. 4.

The voltage of the 14-volt bus 18b can be maintained at a specified voltage level by controlling the duty ratio of the upper switches, $S_1$ and $S_3$. The duty ratio, d is defined by the following expression in terms of phase angle, $\phi$.

$$d = \frac{\varphi}{2\pi}. \quad (1)$$

At steady state, the voltages across the capacitors $C_1$, $C_2$, $C_3$ and $C_4$ and the positive and negative amplitudes of the voltage source bridges are determined by the duty cycle. For $V_{14V}=14$ dc volts, $V_{42V}=42$ dc volts and at steady state, the duty ratio for the combined buses is fixed at $d=1/3$ by the ratio of their voltages and the power transferred through the transformer can be expressed by $$P = \frac{V_{42V} V_{HV}}{n} \cdot \frac{\phi}{2\pi f_{sw} L_s} \cdot \left[\frac{2}{9} - \frac{\phi}{4\pi}\right] \quad (2)$$

where n is the transformer turns ratio, $L_s$ is the transformer leakage inductance and $f_{sw}$ is the switching frequency. For a given design, and assuming that the switching frequency and the duty cycle are fixed, the power transfer can be controlled by the phase shift, $\phi$, and the maximum power, $P_{max}$, is determined by the following expressions:

$$P_{max} = \frac{V_{42V} V_{HV}}{n} \cdot \frac{4\pi}{81 \omega L_s} \quad (3)$$

at $$\phi_{P_{max}} = \frac{4\pi}{9}$$

The capacitance values of the four capacitors, $C_1$, $C_2$, $C_3$ and $C_4$, are preferably chosen according to the nominal voltages of the 14-volt and 42-volt buses, $V_{42V\_norm}$ and $V_{12V\_norm}$, by $$C_2 = \left(\frac{V_{42V\_norm}}{V_{14V\_norm}} - 1\right) C_1 \quad (4)$$

$$C_4 = \left(\frac{V_{42V\_norm}}{V_{14V\_norm}} - 1\right) C_3.$$

The operation of the converter in one switching period can be divided into intervals triggered by switching actions and illustrated in FIG. 4. FIG. 4 shows the ideal transformer voltage and current waveforms according to the operating principle of the converter, where $v_{trL}$ and $v_{trH}$ represent the primary and secondary voltage of the transformer 23, respectively, and $i_{trL}$ the primary current. Further, $\phi$ denotes the angular width of the positive cycle of the transformer voltages, $\phi$ the phase angle between the primary and secondary voltages, $v_{trL}$ and $v_{trH}$, $\omega$ the angular switching frequency of the switches, and $t_d$ the dead time by which after one of the switches of a pair is turned off the turn-on of the other switch is delayed to prevent shoot-through of dc bus due to the non-instantaneous switching actions of the semiconductor switches. The dead time period is also needed for creating soft-switching conditions. For instance, upon turning off the switch $S_2$ while the transformer current $i_{trL}$ is negative, a resonance occurs between the switch capacitors $C_{r1}$ and $C_{r2}$, and the transformer leakage inductance, discharging the capacitors $C_{r1}$ and charging $C_{r2}$. Once the charging/discharging cycle is completed, the transformer current $i_{trL}$ flows through the anti-parallel diode of the switch $S_1$, which offers a zero-voltage condition for $S_1$ to turn on.

Power flow across the transformer 23 can be controlled in either direction by adjusting the phase angle, $\phi$ between the output voltages of the two voltage source converters, $v_{trL}$ and $v_{trH}$. When the primary voltage, $v_{trL}$, leads the secondary voltage, $v_{trH}$, power is transferred from the 42-volt bus 19b to the high voltage bus 17b, and the power flow is reversed by making the secondary voltage $v_{trH}$ lead the primary voltage, $v_{trL}$. The amount of power increases as the phase angle grows and reaches a maximum at a certain phase angle.

Figure 5:
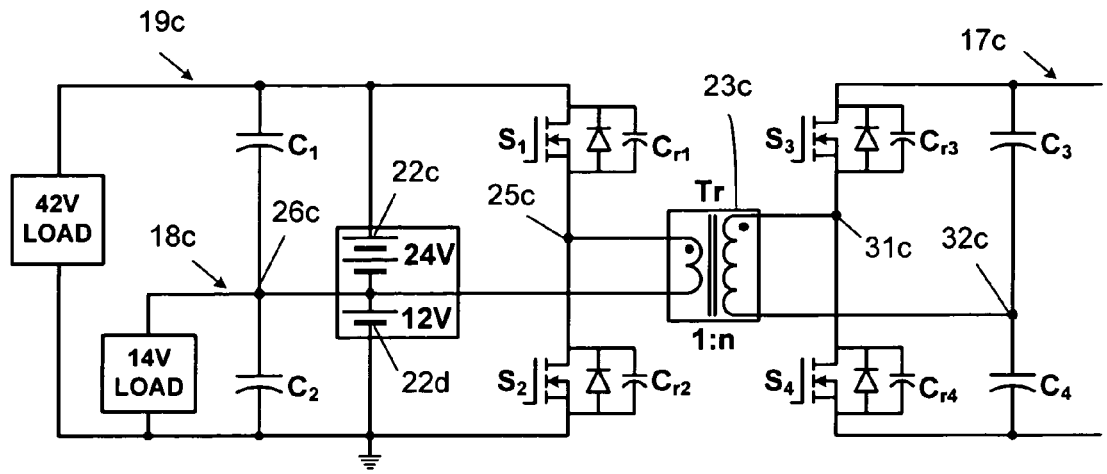
FIG. 5 is an electrical schematic diagram of a second embodiment of the present invention.

FIG. 5 shows a second embodiment, where the battery is tapped, so that a 12-volt battery module is connected in parallel with the capacitor $C_2$ and the 24-volt module 22c is connected in parallel with $C_1$. The high voltage converter is constructed the same as in FIG. 3. By connecting a 12-volt battery module 22d in parallel with the capacitor $C_2$ and a 24-volt module 22c with capacitor, $C_1$, the respective capacitance of capacitors, $C_1$ and $C_2$, can be significantly reduced while still maintaining a tightly regulated dc voltage at the 14-volt and 42-volt buses. This also restricts the physical size and volume of the capacitances $C_1$ and $C_2$.

Figure 6:
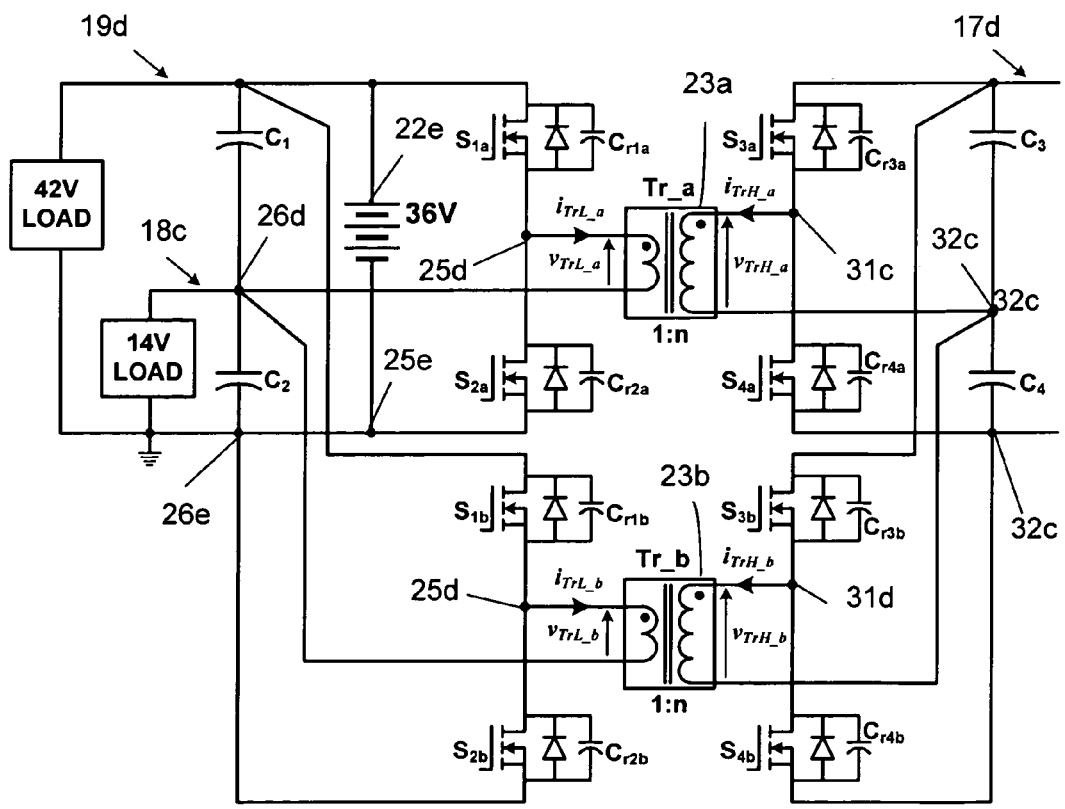
FIG. 6 is an electrical schematic diagram of a third embodiment of the present invention.

FIG. 6 shows a third embodiment with a modular structure, where two basic circuit modules of FIG. 3 are connected in parallel while sharing the dc bus capacitors $C_1$, $C_2$, $C_3$ and $C_4$. This provides a convenient way not only to scale up the power levels but also to reduce the ripple currents in the dc bus capacitors. Because a given capacitor can only handle a fixed amount of ripple current, a smaller ripple current requires less capacitance to bear it and thus reduces the capacitor's volume and cost. More modules can be added similarly.

Figure 7:
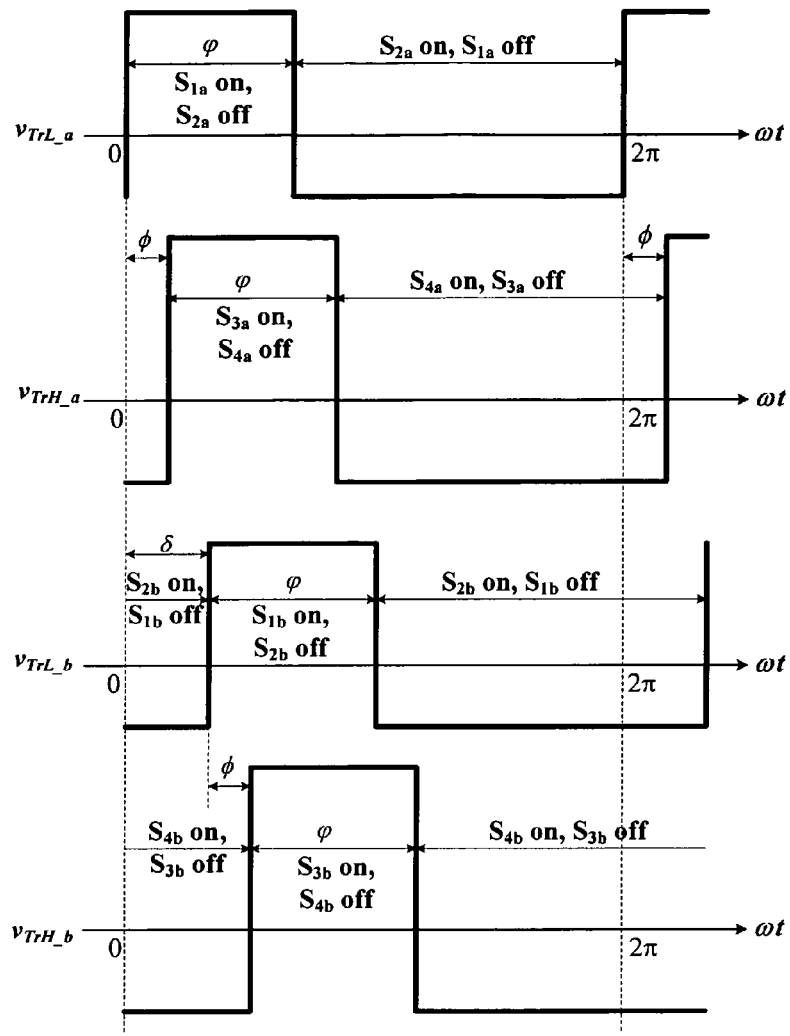
FIG. 7 is a timing diagram of voltage vs. time for switching in the embodiment of FIG. 6.
Figure 8:
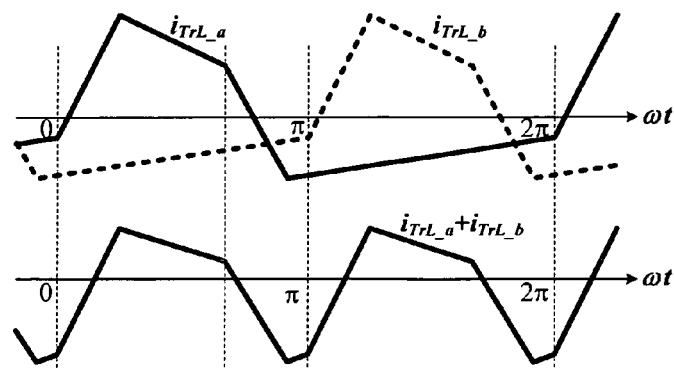
FIG. 8 is a timing diagram of electrical current vs. time for switching in the embodiment of FIG. 6.

FIG. 7 illustrates the voltage phase angle shifts for the embodiment in FIG. 6. To reduce the ripple currents to the dc bus capacitors, the switches are gated in the way that the respective low and high voltages across the two transformer terminals, $v_{trL\_a}$ and $v_{trL\_b}$, $v_{trH\_a}$ and $v_{trH\_b}$, have a phase angle displacement, $\delta$, where the dead time is omitted for simplicity. For the embodiment with two modules in FIG. 6, the preferred value of the phase angle displacement $\delta$ is $\pi$; for a configuration with m modules, a displacement of $\delta=2\pi/m$ is preferred between the voltages of any two neighboring modules. This will also introduce the same amount of phase angle shift into the currents of the two transformers as illustrated in FIG. 8. The combined currents at the low voltage side, $i_{trL\_a}$ plus $i_{trL\_b}$, is the current that flows into the two dc bus capacitors $C_1$ and $C_2$ and will have reduced peak and root-mean-squared (rms) values while doubling the fundamental frequency compared to the current that would be produced with a single module at the same power level, as shown in FIG. 4. The same is true for the high voltage side currents.

This has been a description of the preferred embodiments of the invention. The present invention is intended to encompass additional embodiments including modifications to the details described above which would nevertheless come within the scope of the following claims.

I claim:

1. A dc-to-dc power converter comprising:
a transformer;
a primary dc power circuit and a secondary dc power circuit coupled through the isolation transformer;
the primary dc power circuit and the secondary dc power circuit each further comprising at least two tank capacitances arranged in series as a tank leg, at least two resonant switching devices arranged in series with each other and arranged in parallel with the tank leg, and at least one voltage source arranged in parallel with the tank leg and the resonant switching devices, said resonant switching devices including power semiconductor switches that are operated by gating signals;

a switching controller operable for providing the gating signals to the resonant switching devices in the primary and secondary circuits to control power flow between the primary and secondary dc power circuits;

wherein the switching controller operates to control power flow from the primary dc power to the secondary dc power circuit, or from the secondary dc power circuit to the primary dc power circuit by providing gating signals to control a phase shift between a primary voltage in the primary dc power circuit and a secondary voltage in secondary dc power circuit;

wherein the primary dc power circuit includes at least two low voltage buses to provide a plurality of voltages through the primary dc power circuit; and wherein the primary dc power circuit does not include filtering capacitors or bus inductors connected to the two low voltage buses.

2. The dc-to-dc power converter of claim 1, wherein a duty cycle of switching and a frequency of switching of the primary dc power circuit is set to a constant value in the controller while controlling an amount of phase shift between the primary voltage and the secondary voltage.

3. The dc-to-dc power converter of claim 1, wherein a duty cycle of switching and a frequency of switching of the primary dc power circuit is set to a constant value in the controller while controlling an amount of phase shift between the primary voltage and the secondary voltage.

4. The dc-to-dc power converter of claim 3, wherein the primary dc power circuit includes two lower voltage buses and wherein the secondary dc power circuit includes at least one high voltage bus of significantly greater voltage than either of the two low voltage buses.

5. The dc-to-dc power converter of claim 1, wherein the primary dc power circuit includes two lower voltage buses and wherein the secondary dc power circuit includes at least one high voltage bus of significantly greater voltage than either of the two low voltage buses; and wherein the primary dc power circuit voltage source includes a center-tapped battery with a center tap connected to a midpoint between the two capacitances in the primary dc power circuit to control capacitance size and to control ripple in the capacitors.

6. The dc-to-dc power converter of claim 1, further comprising at least two second resonant switching devices connected in parallel with the tank leg and with the two first resonant switching devices in each of the primary dc power circuit and the secondary dc power circuit, respectively, and coupled through a second transformer to reduce the ripple current in the capacitors in the tank legs of primary dc power circuit and the secondary dc power circuit, and wherein the second two resonant switching devices are operated at a phase difference between the primary dc power circuit and the secondary dc power circuit that is reduced to one half a phase difference between a converter having only a single primary dc power circuit and a single secondary dc power circuit.

7. The dc-to-dc power converter of claim 1, in combination with an ac-to-dc inverter and an electrical motor for a hybrid vehicle.

8. The dc-to-dc power converter of claim 1, in combination with an ac-to-dc inverter and an electrical motor for a fuel-cell powered vehicle.

9. A method of transforming power between a low voltage dc converter and a high voltage dc converter, the method comprising:

coupling a primary dc power circuit and a secondary dc power circuit coupled through an isolation transformer;

the primary dc power circuit and the secondary dc power circuit each further comprising at least two tank capacitances arranged in series as a tank leg, at least two resonant switching devices arranged in series with each other and arranged in parallel with the tank leg, and at least one voltage source arranged in parallel with the tank leg and the resonant switching devices, said resonant switching devices including power semiconductor switches that are operated by gating signals;

providing the gating signals to the resonant switching devices in the primary and secondary circuits to control power flow between the primary and secondary dc power circuits;

wherein the gating signals control a phase shift between a primary voltage in the primary dc power circuit; and wherein the primary dc power circuit includes at least two low voltage buses to provide a plurality of voltages through the primary dc power circuit; and wherein the primary dc power circuit does not include filtering capacitors or bus inductors connected to the two lower voltage buses.

10. The method of claim 9, wherein a duty cycle of switching and a frequency of switching of the primary dc power circuit are held at a constant value while controlling an amount of phase shift between the primary voltage and the secondary voltage.

11. The method of claim 9, wherein the primary dc power circuit includes two lower voltage buses and wherein the secondary dc power circuit includes at least one high voltage bus of significantly greater voltage than either of the two low voltage buses; and wherein the voltages on the primary dc power buses are not filtered with filtering capacitors nor applied across bus inductors connected to the two lower voltage buses.

12. The method of claim 9, further comprising providing the primary dc power circuit with two lower voltage buses and a center-tapped battery; and connecting the center tap to a midpoint between the two capacitances in the primary dc power circuit to control capacitance size and to control dc ripple across the capacitors.

13. The method of claim 9, further comprising connecting at least two second resonant switching devices in parallel with a tank leg and with the two first resonant switching devices in each of the primary dc power circuit and the secondary dc power circuit, respectively, and coupling the second resonant switching devices through a second transformer to reduce the ripple current in the capacitors in the tank legs of primary dc power circuit and the secondary dc power circuit, and operating the second two resonant switching devices at a phase difference between the primary dc power circuit and the secondary dc power circuit that is reduced to one half a phase difference between a converter having only a single primary dc power circuit and a single secondary dc power circuit.

* * * * *